United States Patent
Santiyanont et al.

[11] Patent Number: 5,218,056
[45] Date of Patent: Jun. 8, 1993

[54] ELASTOMERS

[75] Inventors: Kiartchai Santiyanont; Narong Chokwatana; Jariya Boonjawat, all of Bangkok, Thailand

[73] Assignee: Banpan Research Laboratory, Ltd., Bangkok, Thailand

[21] Appl. No.: 645,081

[22] Filed: Jan. 23, 1991

Related U.S. Application Data

[63] Continuation-in-part of Ser. No. 520,580, May 8, 1990, abandoned.

[51] Int. Cl.$^5$ .............................................. C08C 19/40
[52] U.S. Cl. .................. 525/332.6; 525/316; 525/333.1; 523/167; 524/425; 524/571; 524/764; 526/340.2
[58] Field of Search ............ 525/316, 332.6; 523/167; 524/425, 571, 764; 526/340.2; 528/333.1

[56] References Cited

U.S. PATENT DOCUMENTS

| | | | |
|---|---|---|---|
| 3,957,737 | 5/1976 | Pautrat et al. | 525/333.1 |
| 3,981,943 | 9/1976 | Fujio et al. | 525/316 |
| 4,314,920 | 2/1982 | Millen | 528/374 |
| 4,695,609 | 9/1987 | Stevenson | 525/352 |
| 4,894,425 | 1/1990 | Hellermann et al. | 525/333.1 |

FOREIGN PATENT DOCUMENTS 065476 11/1987 European Pat. Off.
50-013434 2/1975 Japan.
61-255601 11/1986 Japan.

OTHER PUBLICATIONS

Pautrat, R. and Leveque, J., scientific article entitled "Preparation and Application of Natural Liquid Rubber," pp. 207–213, inclusive, of publication entitled Powdered, Liquid and Thermoplastic Natural Rubber, Proceedings of a Symposium sponsored by the United Nations Industrial Development Organization in association with The International Rubber Research and Development Board, May 14–15, 1981, Phuket, Thailand, published by Malaysian Rubber Research and Development Board.

Primary Examiner—Paul R. Michl
Assistant Examiner—Edward J. Cain

[57] ABSTRACT

A polyisoprene elastomer has a polyisoprene content with an average molecular weight in the range of 15,000 to 70,000 and preferably 25,000 to 50,000. This has been cross-linked with an unsaturated aromatic compound and cured with a sulfur or peroxide curing system. The elastomer has an extremely low compression set (0 to 5%) and an extremely low durometer (Shore A, 0 to 20). The elastomer is lightweight, soft, flexible and durable and its properties make its shock-absorbing and shock-attenuating characteristics unique. It is therefore highly suitable for insole and/or midsole components in footwear.

10 Claims, 2 Drawing Sheets

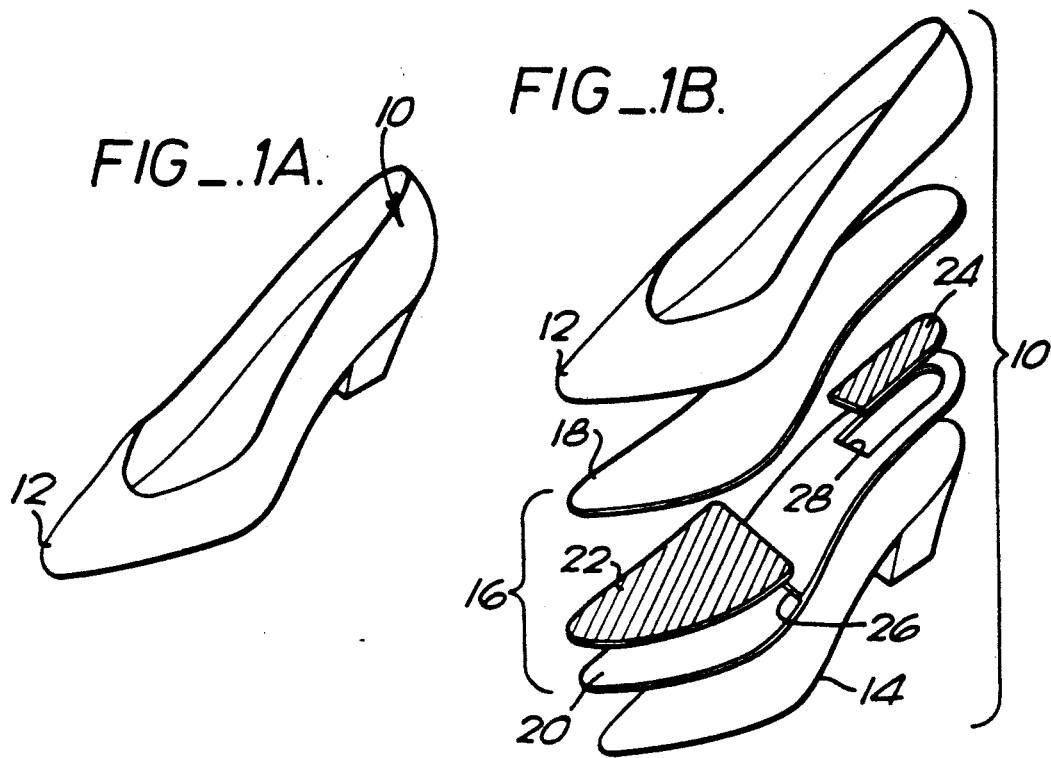
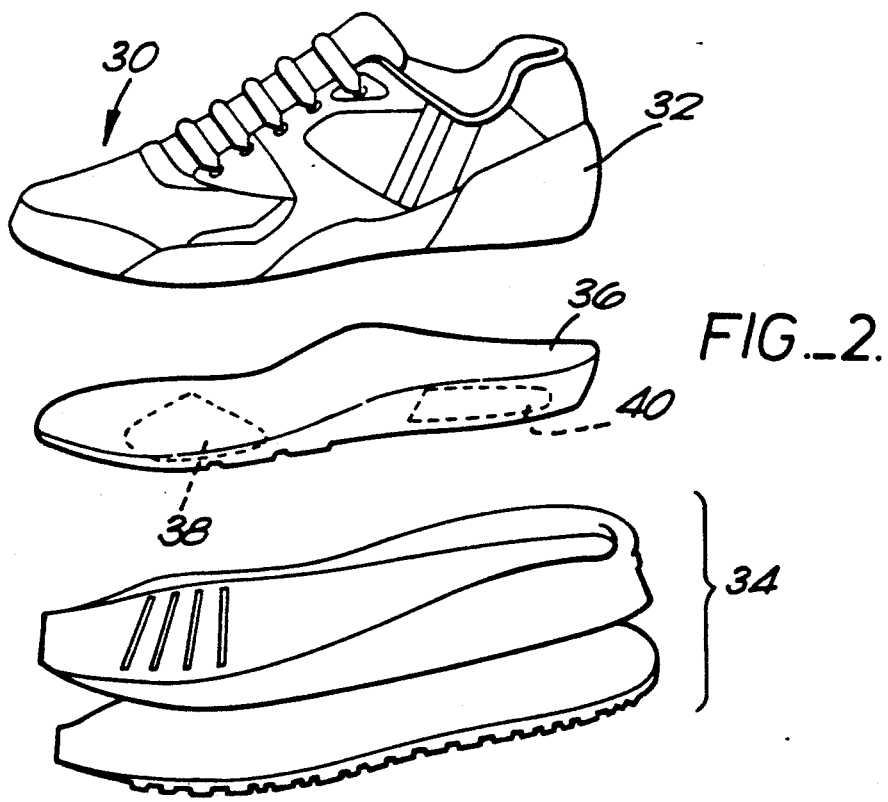

FIG_3.
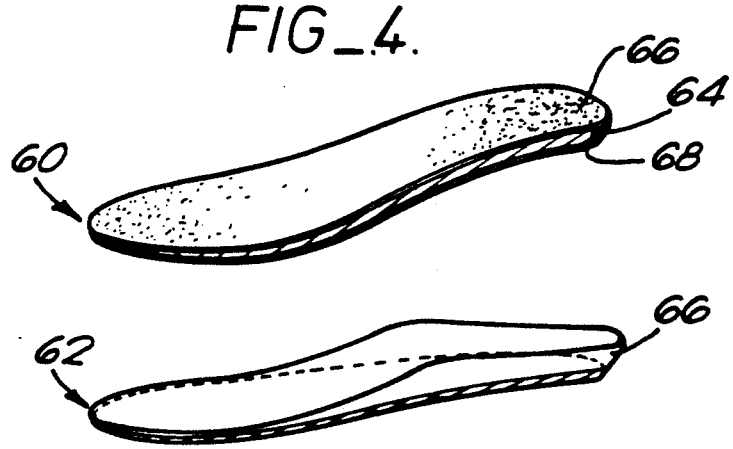
FIG_4.
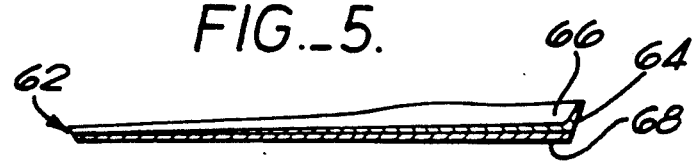
FIG_5.

ELASTOMERS

CROSS REFERENCE TO RELATED CASE

This application is a Continuation-in-Part of application Ser. No. 07/520,580 filed on the May 8, 1990 now abandoned.

This invention relates to elastomers and in particular a polyisoprene elastomer which has use in the construction of footwear and in particular inserts such as insoles and midsoles for footwear.

BACKGROUND TO THE INVENTION

Known elastomers for cushioning shock include polyurethane elastomers and ethylene vinyl acetate polymers. U.S. Pat. No. 4,346,205 shows a typical example of a polyurethane. It has a low hardness and low compression set but a slow recovery after compression which makes it less than ideal for use as an insert in footwear.

It is therefore an object of the invention to provide a non-polyurethane elastomer which is highly suitable for use in making inserts in footwear.

BRIEF SUMMARY OF THE INVENTION

According to the invention there is provided a polyisoprene elastomer in which the polyisoprene content has an average molecular weight of 15,000 to 70,000, and in which the polyisoprene has been cross-linked with an unsaturated aromatic compound cross-linking agent and cured with a sulfur curing system or a peroxide curing system, the resulting elastomer having a low compression set of 0 to 5%, and a low durometer as measured in the Shore A scale of 0 to 20.

An insole/midsole component can be constructed from such an elastomer to have a required hardness, compression set and a required percentage rebound resilience at constant thickness by varying the degree of cross-linking. In consequence, different insole/midsole components can provide a variable yet large range of cushioning effects, which is necessary for potential users of the footwear having different body weight ranges, and also for use in different sports activities. The polyisoprene elastomer of the invention is fully cured and so its properties remain consistent with time.

This is in contrast with prior art footwear where the thickness and volume of an insole component for footwear is limited by the design and size of the footwear, and material for the insole component has to be chosen for the specific cushioning requirement of that particular piece of footwear. In U.S. Pat. Nos. 900,867, 1,069,001, 1,304,915, 1,514,468, 1,869,257, 2,080,469, 2,645,865, 2,677,906, 3,469,576, 4,183,156 and 4,451,994, arrangements are described for providing comfortable support in footwear, and in particular fluid (i.e. liquid or gas) filled insoles. In U.S. Pat. No. 2,055,077 a sponge rubber insole is disclosed, while in U.S. Pat. No. 4,451,994 a sponge rubber insole component with air spaces is described. In all these arrangements, there are difficulties in the manufacturing of such insoles, because the insoles are complicated in design, and it has also been found that any one of the above types of insoles is only useful for a very limited range of body weight of potential users for the footwear.

Suitably, the elastomer of the invention is moulded in the shape of the required insole component. The very soft and almost flowable nature of the elastomer provides even distribution of forces exerted on the forefoot portion and the heel portion of the insole.

The unsaturated aromatic compound can be an aromatic alkenyl compound and an example is a di-vinyl compound such as di-vinyl benzene.

The sulfur curing system can be one based on sulfur or a sulfur yielding material such as tetramethyl thiuram disulfide, or a conventional accelerator of sulfur vulcanisation.

Suitably, the insole/midsole component absorbs and attenuates shock forces experienced during walking, running or jumping. In particular, different body weights of users and different sports activities require different degrees of shock absorption and dissipation and the nature of the elastomer can be adapted accordingly. Such advantageously give more uniform and even distribution of the forces exerted on the forefoot portion and the heel portion, thereby increasing comfort whilst reducing the tendency of the footwear to produce foot and leg injuries. Another advantage of the invention is that a range of insole/midsole components can be provided having shock-absorbing and attenuating qualities, which components each cover a large range of potential footwear user body weights, and a range of different sport activities or casual walking.

An insole/midsole component made from an elastomer according to the invention is particularly useful for dress shoes and sport shoes of all types, and in particular is suitable for different body weight ranges of potential users.

A further advantage of the invention, is that an insole/midsole component made from an elastomer according to the invention is relatively simple in design, and little modification to existing footwear is required.

DESCRIPTION OF THE DRAWINGS

The invention will now be described, by way of example, with reference to the accompanying drawings, in which:

FIGS. 1A and 1B are a perspective view and an exploded view of a ladies dress shoe using an insole/midsole component made from an elastomer in accordance with the invention;

FIG. 2 shows a perspective view of a running shoe using an insole/midsole component in accordance with the invention;

FIG. 3 shows a further embodiment of footwear using an insole/midsole component in accordance with the invention; and FIGS. 4 and 5 show insertable sock liners for footwear incorporating full length shock absorbing pads made of an elastomer according to the invention.

DESCRIPTION OF THE PREFERRED EMBODIMENT

In FIGS. 1A and 1B the dress shoe 10 is shown having a vamp portion 12 and a sole portion 14.

An insole portion 16 is also provided which comprises an upper interlayer 18 and a lower interlayer 20. Sandwiched between these are two shock-absorbing insole pads 22 and 24 which are positioned in recesses 26 and 28, respectively, at the forefoot and heel ends of the lower interlayer 20. These insole pads 22 and 24 are made of elastomer according to the invention such as Specimen A referred to in Table 2 below.

In FIG. 2, a running shoe 30 is shown having an upper or vamp portion 32, and a two-part sole portion 34 on which an insole or midsole portion 36 rests.

The insole/midsole portion 36 is provided with two recesses 38 and 40 in the lower portion thereof, namely at the forefoot and heel ends thereof, and in which pads of the polyisoprene elastomer according to the invention are provided.

In FIG. 3 a boot 40 is shown having a vamp portion 42, and a sole portion 44.

The upper surface of the sole portion 44 is provided with recesses 46 and 48 in the forefoot and heel ends thereof, within which resilient cushioning material in the form of pads 50 of a low molecular weight polyisoprene elastomer according to the invention are provided.

FIGS. 4 and 5 show two forms of insertable full-length sock liners 60 and 62 where a shock absorbing member 64, made from elastomer according to the invention, is sandwiched between an upper fabric member 66 and a lower insole member 68. Such liners 60 and 62 can be used in any conventional shoe.

The elastomer pads provided in the footwear or liners shown in FIGS. 1 to 5 have a thickness in the range of 2 to 6 mm (the heel pad suitably being 3 mm while the toe pad is suitably 2 mm), a durometer (Shore A) ranging from 0 to 20, and a compression set less than 5%, and are constructed to absorb and attenuate the anticipated shock forces experienced during use of the footwear, depending on the body weight of the user and the activity being conducted by the user (which give different degrees of shock absorption). The elastomer pads are constructed to give even distribution of the forces exerted on the forefoot and heel portions of the footwear, thereby increasing comfort and stability, while reducing the possibility of foot and leg injuries.

FIGS. 1 to 3 show simplified embodiments of footwear, and it will be appreciated that the polyisoprene elastomer pads can be provided in footwear having a plurality of insole and/or midsole portions, and indeed in footwear having no midsole portions. Also in place of two pads as shown in FIGS. 1 to 3, a single pad of elastomeric material extending from the forefoot to the heel may be provided.

A preferred method of manufacturing the polyisoprene elastomer of the invention for use in these pads in footwear is to mould a mixture which typically consists of the components listed in the following Table 1.

TABLE 1

| Component | Parts by weight |
| --- | --- |
| Liquid polyisoprene rubber[1] | 100 |
| Filler[2] | 40–80 |
| Petroleum plasticizer[3] | 40–80 |
| Petroleum resin[4] | 3–8 |
| Dye[5] | 2–5 |
| Zinc isopropyl xanthate | 2–6 |
| Zinc salt of 2-mercaptobenzothiazole | 2–6 |
| Zinc oxide | 3–5 |
| Sulfur | 0.8–8, preferably 1–5 |
| Divinyl benzene | 1–3 |
| Phenol-based antioxidant[6] | 0.5–2 |
| Stearic acid | 0.5–2 |

[1]Typical liquid isoprene rubbers which can be used are those obtainable from Kuraray Isoprene Chemical Co Ltd under the trade name Kuraray Liquid IR. Particular rubbers are those known as LIR-50 and LIR-30, LIR-50 being preferred. General properties of LIR-30 and LIR-50 are as follows:

|  | LIR-30 | LIR-50 |
| --- | --- | --- |
| Molecular weight | 29000 | 47000 |
| Specific gravity | 0.91 | 0.91 |
| Melt viscosity (poise at 38° C.) | 740 | 4800 |
| Solution viscosity (cps T.S.C. = 20% solvent = toluene) | 12 | 29 |
| Volatile, wt % | 0.45 | 0.45 |
| Functional Groups Number of Moles of functional groups (in one molecule of LIR) | — | — |
| Indene value (g/100) | 368 | 368 |

[2]Suitable fillers are silicon dioxide or calcium carbonate.
[3]A suitable petroleum plasticizer is that available from the Shell Company of Thailand Limited under the trade name Rubber Oil BR. This is a highly refined base stock. The oil has a relatively low viscosity.
[4]A suitable petroleum resin is Coumarone Resin available from Nittetsu Chemical Company, Japan. The resin is a polymer consisting mainly of styrene, coumarone and indene.
[5]A typical dye is Green FG-9000 available from UK Seung Chemical Co Ltd of Pusan, Korea.
[6]A suitable antioxidant is Permanax WSL, a methylcyclohexyl derivative of selected xylenols, available from Vulnax International Ltd. or Cook Chemical Company.

To prepare the mixture, the filler and plasticizer are first mixed and then homogeneously mixed with the zinc isopropyl xanthate, the zinc salt, zinc oxide, sulfur, divinyl benzene, the antioxidant and the stearic acid. Separately the liquid polyisoprene rubber and the dye are well kneaded and the prepared mixture of the other components is added. The resulting viscous mixture is masticated for about one hour. The cross-linking reaction is then effected in a stainless steel mould by raising the curing temperature to 120° to 125° C. for about one hour.

The physical properties of one resulting cross-linked liquid rubber according to the invention, Specimen A, are summarized in the following Table 2. The maintenance of low hardness and low compression set is to be noted. The precise formulation of Specimen A was as follows:

| Component | Parts by Weight |
| --- | --- |
| Liquid polyisoprene rubber (LIB-30) | 100.0 |
| Calcium carbonate | 48.0 |
| Petroleum plasticizer | 50.0 |
| Petroleum resin | 5.0 |
| Dye | 3.0 |
| Zinc isopropyl xanthate | 3.5 |
| Zinc salt of 2-mercaptobenzothiazol | 2.5 |
| Sulfur | 0.9 |
| Divinyl benzene | 1.0 |
| Phenol-based antioxidant | 1.0 |
| Stearic acid | 1.0 |

TABLE 2

| Physical property | Unit | Specimen A |
| --- | --- | --- |
| Hardness | Shore A | 0.5 |
| Hardness | Shore C | 5 |
| Shrinkage 70° C., 40 min | % | 0 |
| Elongation at break | % | 600 |
| Tensile strength | kg/cm$^2$ | 1.5 |
| Tear strength | kg/cm$^2$ | 1.2 |
| Density | g/cm$^3$ | 1.06 |
| Compression set (at 50° C. for 5 h) | % | 0 |
| Impact energy return (47 g ball at 153 cm) | % | 0 |

The shock absorbing properties and energy return of three Specimens A to C, of polyisoprene elastomers according to the invention were investigated by the Dunlop tripsometer (BS 903) pendulum rebound test at 20° C. with an angle drop of 40° and sample thickness of 4 mm. In the following Table 3 the three specimens A to C are compared with various known elastomers.

It will be noted that the impact absorbing properties of the specimens according to the invention with very low hardness appeared as "dead", i.e. no significant rebound at all.

TABLE 3

| Material | Hardness Shore A | Hardness Shore C | Rebound Resilience (%) |
|---|---|---|---|
| Specimen A | 1 | 5 | 0 |
| Specimen B | 2 | 15 | 0 |
| Specimen C | 3-4 | 21 | 22.5 |
| Polyurethane | 12-13 | 36 | 7.3 |
| EVA | 17 | 33 | 27.8 |
| EVA | 20 | 35 | 54.4 |
| Natural rubber | 58 | 82 | 86.7 |

In the above Table 3, the polyurethane was that available under the Trade Mark Sorbothane. The EVA samples were ethylene vinyl acetate polymers typically available as sock liners for footwear, whilst the natural rubber is that available according to American Chemical standard.

Specimens A to C differed in the amounts of sulfur used in curing the elastomer, the other components remaining as set out in Table 1.

TABLE 4

| Specimen | Sulfur (parts/100 parts by weight of polyisoprene) | Hardness (Shore A) |
|---|---|---|
| A | 0.9 | 1 |
| B | 2.7 | 2 |
| C | 4.0 | 3-4 |

As can be seen the hardness can be varied by varying the amount of the sulfur curing agent. As an alternative, hardness can be varied in a limited range by varying the amounts of the zinc isopropyl xanthate and/or the filler.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

We claim:

1. A polyisoprene elastomer comprising:
polyisoprene having an average molecular weight of 15,000 to 70,000 cross-linked during a curing process with an unsaturated aromatic compound cross-linking agent
and cured with a curing system selected from the group consisting of a sulfur curing system and a peroxide curing system,
said polyisoprene elastomer having a low compression set in the range of 0 to 5%, and a low durometer of 0 to 20 measured on the Shore A scale.

2. An elastomer according to claim 1 in which the polyisoprene has an average molecular weight of 25,000 to 50,000.

3. An elastomer according to claim 1 in which the unsaturated aromatic compound is an aromatic alkenyl compound.

4. An elastomer according to claim 3 in which the unsaturated aromatic compound is a di-vinyl compound.

5. An elastomer according to claim 4 in which the unsaturated aromatic compound is di-vinyl benzene.

6. An elastomer according to claim 1 which comprises the following components:

| Component | Parts by weight |
|---|---|
| Liquid polyisoprene rubber | 100 |
| Filler | 40-80 |
| Petroleum plasticizer | 40-80 |
| Petroleum resin | 3-8 |
| Dye | 2-5 |
| Zinc isopropyl xanthate | 2-6 |
| Zinc salt of 2-mercaptobenzothiazol | 2-6 |
| Zinc oxide | 3-5 |
| Sulfur | 0.8-8 |
| Divinyl benzene | 1-3 |
| Phenol-based antioxidant | 0.5-2 |
| Stearic acid | 0.5-2. |

7. An elastomer according to claim 6 which comprises the following components:

| Component | Parts by Weight |
|---|---|
| Liquid polyisoprene rubber (LIR-30) | 100.0 |
| Calcium carbonate | 48.0 |
| Petroleum plasticizer | 50.0 |
| Petroleum resin | 5.0 |
| Dye | 3.0 |
| Zinc isopropyl xanthate | 3.5 |
| Zinc salt of 2-mercaptobenzothiazol | 2.5 |
| Sulfur | 0 9 |
| Divinyl benzene | 1.0 |
| Phenol-based antioxidant | 1.0 |
| Stearic acid | 1.0. |

8. A sole component for footwear comprising a polyisoprene elastomer, said polyisoprene elastomer comprising:
polyisoprene having an average molecular weight of 15,000 to 70,000 cross-linked during a curing process with an unsaturated aromatic compound cross-linking agent and cured with a curing system selected from the group consisting of a sulfur curing system and a peroxide curing system,
said isoprene elastomer having a low compression set in the range of 0 to 5%, and a low durometer of 0 to 20 a measured on the Shore A scale.

9. An article of footwear comprising an elastomeric sole component, said elastomeric sole component comprising:
polyisoprene having an average molecular weight of 15,000 to 70,000 cross-linked with an unsaturated aromatic compound cross-linking agent and cured with a curing system selected from the group consisting of a sulfur curing system and a peroxide curing system,
said cured cross-linked elastomer having a low compression set in the range of 0 to 5%, and a low durometer of 0 to 20 a measured on the Shore A scale.

10. An elastomer according to claim 1 wherein the polyisoprene is KURARAY LIQUID IR.

* * * * *